United States Patent
Heindorf et al.

(10) Patent No.: US 10,936,684 B2
(45) Date of Patent: Mar. 2, 2021

(54) AUTOMATICALLY GENERATING INSTRUCTIONS FROM TUTORIALS FOR SEARCH AND USER NAVIGATION

(71) Applicant: Adobe Inc., San Jose, CA (US)

(72) Inventors: Stefan Heindorf, Paderborn (DE); Nedim Lipka, San Jose, CA (US)

(73) Assignee: ADOBE INC., San Jose, CA (US)

( * ) Notice: Subject to any disclaimer, the term of this patent is extended or adjusted under 35 U.S.C. 154(b) by 325 days.

(21) Appl. No.: 15/885,363

(22) Filed: Jan. 31, 2018

(65) Prior Publication Data
US 2019/0236212 A1   Aug. 1, 2019

(51) Int. Cl.
G06F 16/9535   (2019.01)
G06F 16/36   (2019.01)
G06F 16/35   (2019.01)
G06F 9/451   (2018.01)
G06F 16/78   (2019.01)
G06N 5/02   (2006.01)

(52) U.S. Cl.
CPC .......... *G06F 16/9535* (2019.01); *G06F 9/453* (2018.02); *G06F 16/35* (2019.01); *G06F 16/367* (2019.01); *G06F 16/7867* (2019.01); *G06N 5/02* (2013.01)

(58) Field of Classification Search
None
See application file for complete search history.

(56) References Cited

U.S. PATENT DOCUMENTS

| | | | |
|---|---|---|---|
| 2012/0250963 A1* | 10/2012 | Carroll | G06N 5/003 382/128 |
| 2012/0290288 A1* | 11/2012 | Ait-Mokhtar | G06F 40/211 704/9 |
| 2017/0075935 A1* | 3/2017 | Lagos | G06F 16/24578 |
| 2017/0084189 A1* | 3/2017 | Rubalcaba | G09B 7/04 |
| 2019/0123982 A1* | 4/2019 | Komarek | H04L 63/1425 |

\* cited by examiner

*Primary Examiner* — Giuseppi Giuliani
(74) *Attorney, Agent, or Firm* — Kilpatrick Townsend & Stockton LLP

(57) ABSTRACT

Various embodiments describe a segmentation application that uses a predictive model to segment content from instruction manuals. In an example, the segmentation application receives training data including training labels and steps available from instruction manuals. The segmentation application trains a predictive model based on the training data and a loss function. The training includes generating, by the predictive model, a prediction of whether the sub-step is the start of the step and minimizing the loss function based on comparison of the prediction to the training label. Upon completion of the training, the segmentation application identifies electronic sources and a start indicator indicating a start of a specific step. The segmentation application provides, in response to a query about an object from a client device, a step generated from the start indicator.

20 Claims, 7 Drawing Sheets

400

401 — Receive, by a computing system, training data including training labels and steps available from the instruction manuals, each step includes one or more sub-steps annotated by the training labels and a training label identifies whether the sub-step represents a start of a step and whether a sub-step represents an end of the step and the query is a request for a specific sub-step.

402 — Train, by the computing system, a predictive model based on the training data and a loss function by generating, by the predictive model, a prediction of whether the sub-step is the start of the step, and minimizing the loss function based on comparison of the prediction to the training label.

403 — Train, by the computing system, an additional predictive model based on the training data and an additional loss function by at least generating, by the additional predictive model, an additional prediction of whether the sub-step is the end of the step, and minimizing the additional loss function based on a comparison of the additional prediction to the training label 404 — Receive, by the computing system, a query about an object from a client device.

405 — Identify, by the computing system and based on the query, a plurality of electronic sources.

406 — Generate, by the computing system a specific step of a tutorial based on the predictive model and the additional predictive model.

FIG. 4

AUTOMATICALLY GENERATING INSTRUCTIONS FROM TUTORIALS FOR SEARCH AND USER NAVIGATION

TECHNICAL FIELD

This disclosure relates generally to text segmentation. More specifically, but not by way of limitation, this disclosure relates to automatic text segmentation of instructions by using machine learning models.

BACKGROUND

Search engines provide extensive searching capability of the Internet's vast number of websites and resources. Some websites and resources contain tutorials providing step-by-step guides. Typically, search engines can provide links to these tutorials.

Under certain conditions, some search engines can also extract and provide summaries of the step-by-step guides from these tutorials. To do so, existing solutions necessitate user-generated annotations of the steps in the tutorials. To illustrate, a web page contains hyper-text markup language (HTML) content that describes how to paint a wall. A web designer adds HTML tags to specifically identify the steps. A search engine can then identify the steps based on the HTML tags.

However, absent the user-generated annotations (e.g., the HTML tags in a tutorial web page), search engines cannot extract and summarize steps from the tutorials. Accordingly, multiple drawbacks exist. For example, the available corpus of tutorials is limited to only the annotated tutorials. Hence, the search engines may not return summaries from the most relevant tutorials if not annotated. Further, the annotations are burdensome to generate in the first place and to maintain if the content changes over time.

Additionally, even with annotated tutorials, a search engine cannot extract specific, narrower sub-steps from an annotated step. To illustrate and referring back to the above example of the HTML tutorial, a user submits a narrow search relevant to only a specific step of the tutorial. For instance, the user may search for "how do I open a can of paint?" In this case, the search engine would return the summary of all the steps and would not provide specific sub-steps describing the step of opening the can.

SUMMARY

Various embodiments of the present disclosure describe a segmentation application that uses a predictive model to segment content from instruction manuals. In an example, the segmentation application receives training data including training labels and steps available from instruction manuals. Each step includes one or more sub-steps annotated by the training labels. A training label identifies whether the sub-step represents a start of a step. The segmentation application trains a predictive model based on the training data and a loss function. The training includes generating, by the predictive model, a prediction of whether the sub-step is the start of the step and minimizing the loss function based on comparison of the prediction to the training label. Upon completion of the training, the segmentation application identifies electronic sources. The segmentation application generates for each electronic source, a start indicator indicating a start of a specific step. The segmentation application provides, in response to a query about an object from a client device, a step generated from the start indicator.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 4 depicts a text segmentation configured for fine-granularity queries, according to embodiments of the present disclosure.

DETAILED DESCRIPTION

Figure 1:
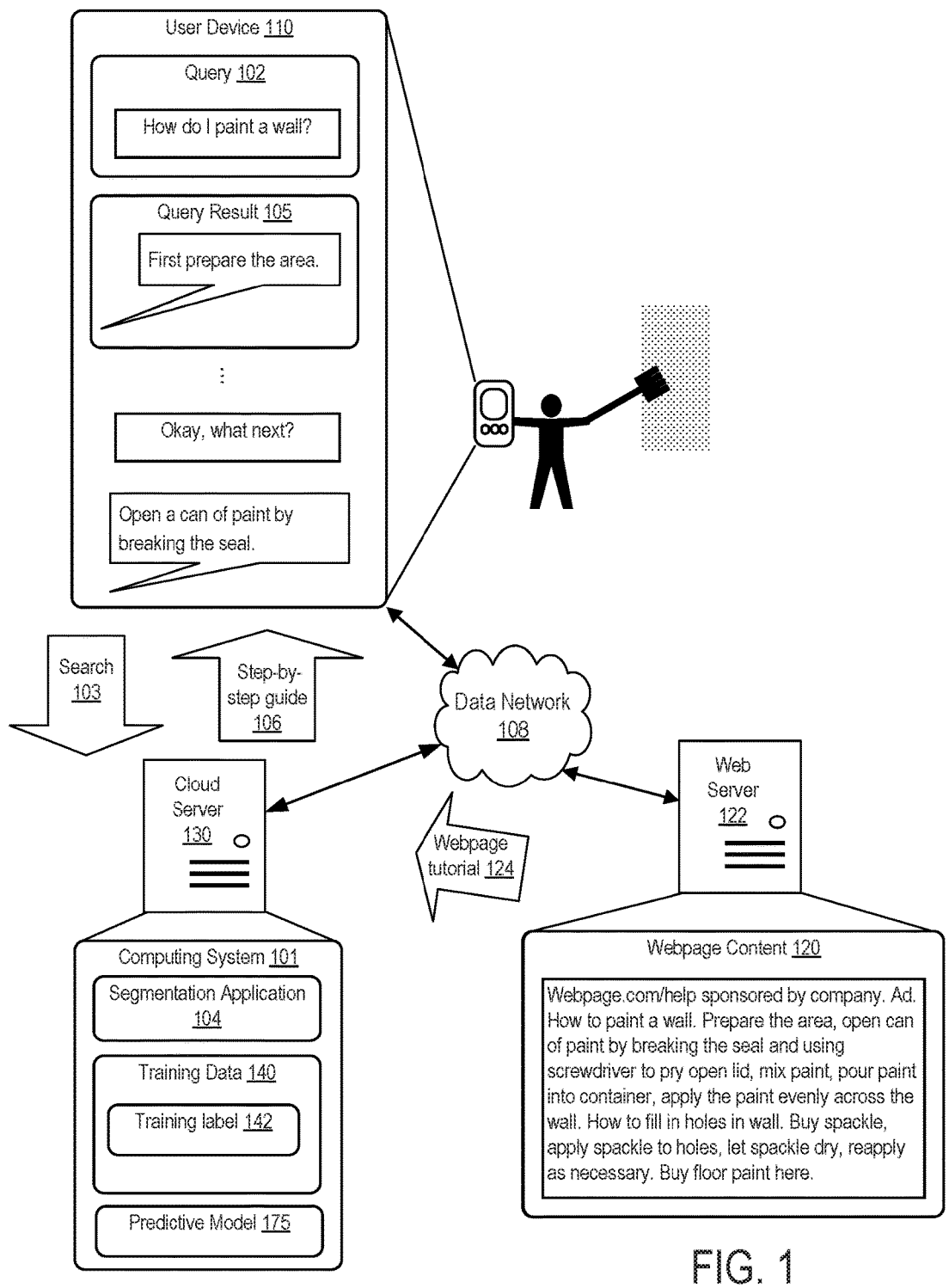
FIG. 1 depicts a text segmentation system, according to certain embodiments of the present disclosure.

Embodiments of the present disclosure involve using trained predictive models to extract and provide summaries (e.g., step-by-step explanations) from electronic documents such as tutorials. Using a predictive model, a search engine can return summaries at different granularity levels (e.g., step and sub-step levels) from any electronic document, regardless of whether the document is annotated. Hence, the corpus of electronic documents is significantly increased relative to existing solutions while also reducing or even eliminating the burden of user-generated annotations. Hence, the search engine can return more relevant results in response to user searches.

In an example, a user device submits a question for a broad search such as "how do I paint a wall?" The search engine locates a tutorial most relevant to the query. The search engine uses the predictive model that is trained to extract summaries from the tutorial without necessitating any specific annotations. Accordingly, the search engine inputs the content of the tutorial to the predictive model, receives back extracted steps, and sends the steps to the user device. The user device presents the search results accordingly, for example, by displaying the step of "first prepare the area and open can of paint by breaking the seal and using a screwdriver to pry open the lid." The user continues to query the search engine by submitting more granular searches. For example, the user asks "how do I break the seal of the can of paint?" The search engine, relying on the predictive model, extracts additional steps from the tutorial or searches for additional relevant tutorials as appropriate and returns the relevant summary to the user device.

According to embodiments of the present disclosure, the predictive model is trained to segment an electronic document into discrete steps and sub-steps, without necessitating user annotations of such steps in the content of the electronic document. A step refers to a segment of a tutorial or instruction manual. A sub-step refers to a part of a step. Continuing the above example, a step could be "open a can of paint by breaking the seal and using a screwdriver to pry open the lid." A sub-step could be "break the seal." Hence, upon completion of the training, the predictive model becomes usable to segment content from a tutorial into a set of steps, and, as applicable, sub-steps falling under the steps.

The predictive model can be implemented as a learning algorithm such as a neural network. The training is supervised. For example, the training data includes training tutorials and training labels. Each training label can identify the start or the end of a step in a training tutorial. During the training, the training data is input to the predictive model. In response, the predictive model learns to segment tutorials by minimizing a cost function given the training data. More specifically, the predictive model predicts, for example, a step in a training tutorial and compares this prediction to the relevant training label. Mismatches between the predicted steps and the training labels result in penalties. Minimizing the cost function involves updating the parameters of the predictive model such that the penalties are minimized. The granularity of the training labels can be adjusted to enable the predictive model to also predict subs-steps enable richer search engine functionality.

Embodiments of the present invention provide advantages over previous solutions. For example, systems described herein provide the ability to access content from any source, including sources that are not annotated. Hence, the computational and manual burdens for annotating content are eliminated and the amount of available content is significantly increased. Additionally, embodiments of the present invention improve the presentation of tutorial information to users. For example, by presenting only the relevant tutorial steps to a user systems described herein are more intuitive and user friendly.

As used herein, "predictive model" refers to a model that can be trained to predict outcomes based on a set of observations. For example, a predictive model can include neural networks, regression models, decision trees, convolutional neural networks, recurrent neural networks, long-short term neural networks, gradient boosting, or other models.

As used herein, "structured content" is content, for example, text that includes embedded annotations (e.g., tags) that identify the content. For example, a hypertext markup language (HTML) tutorial is structured content and includes tags that identify the structure of the content (e.g., header, footer, body, fields, field types, etc.).

As used herein, "unstructured content" refers to content that lacks the structural information found in structured content. For example, an online tutorial that is unstructured is a block of text without tags that identify the steps of the tutorial.

As used herein, "electronic source" is a source of electronic content. For example, an electronic source can be a website, DVD, electronic library, or other electronic document.

As used herein, "step" refers to a segment of an electronic source that forms a step of a tutorial or instruction manual. For example, a step could be "open the door by turning the handle, and pushing the door."

As used herein, "sub-step" refers to part of a step within an online source. For example, a sub-step could be "turn the handle."

As used herein, "training label" refers to an annotation in training data that denotes the sub-step that is the start of a step, or the sub-step that is the last sub-step in the step.

As used herein, "tagging" refers to the identification of important content within electronic material, such as the identification of any steps within the material. Internet content such as tutorials are specially tagged to enable search engines to identify these steps. For example, HTML tags, Microdata, RDFa, or JSON-LD are embedded into the web page to mark relevant steps.

Turning now to the figures, FIG. 1 depicts a search environment, according to certain embodiments of the present disclosure. Search environment 100 includes a user device 110, a web server 122, and a cloud server 130 connected via data network 108. Data network 108 can be any network such as a local network, wide area network, intranet, or the Internet. Web server 122 is configured to access webpage content 120 and can provide a webpage tutorial 124 to cloud server 130 or user device 110.

Cloud server 130 can be configured to connect to computing system 101, including optionally providing services from computing system 101 as a cloud-based service. For example, user device 110 can submit a search for electronic content, such as search 103 to the cloud server 130. In response, cloud server 130 can send back a step-by-step guide 106 extracted, for example, using predictive model 175.

Search environment also includes webpage content 120 and a computing system 101. FIG. 1 depicts user device 110, computing system 101, and web content 122 as connected through servers, i.e., cloud server 130 and web server 122, and data network 108. But other configurations are possible, such as the functionality of user device 110 and computing system 101 implemented on the same device.

Search environment 100 can receive queries including in natural language, retrieve tutorial content from electronic sources, generate steps of a tutorial, or generate instructions about how the steps can be presented to a client device. Search environment 100 can therefore identify and provide part or all of an online instruction manual. Computing system 101 receives a query from user device 110, obtains webpage content 120, and provides output to user device 110.

Webpage content 120 can be a webpage (such as a product page, do-it-yourself page, question and answer website, or forum); online manual; how-to; customer emails, messages, or call logs; or some other kind of guide available in web form or any other readable document form (e.g., PDF, Microsoft Word, etc.). Webpage content 120 can include instruction manual or tutorial content that is structured or unstructured. Structured content contains embedded information, such as HTML tags, or other labels, indicating the position of some information, but not necessarily the identification of any steps within the webpage content 120. The content can be online or stored locally on a server can be used by segmentation application 104. For example, content from CD or DVD media, stored documents, etc., can be used. But because webpage content can be unstructured and lack the proper annotations, segmentation application 104 determines the steps present in the content.

Computing system 101 includes segmentation application 104, training data 140, and predictive model 175. Segmentation application 104 executing on computing system 101 performs various operations including training the predictive model 175 with training data 140. As discussed further with respect to FIGS. 2-4, predictive model 175 is trained by computing system 101 to segment steps from webpage content 120. Trained predictive model 175 can delineate or segment the steps of webpage content 120. Webpage content can include content irrelevant to the manual such as hyperlinks, comments, advertisements.

Webpage content 120 includes content usable by a predictive model to answer query 102. Webpage content 120 need not include annotations that identify steps or sub-steps of a tutorial. Instead, search environment 100 determines this information.

For example, webpage content 120 includes a tutorial about how to paint a wall and can include other content irrelevant to query 102. As depicted in FIG. 1, the text of webpage content 120 could be the following: "How to paint a wall. Prepare the area, open can of paint by breaking seal and using screwdriver to pry open lid, mix paint, pour paint into container, apply the paint evenly across the wall." In this example, therefore, there are at least three steps in webpage content 120: the first step "prepare the area," the second step "open can of paint by breaking seal and using screwdriver to pry open lid," and the third step "mix paint." Predictive model 175 can determine the steps within webpage content 120.

Segmentation application 104 requests and receives webpage content 120 based on query 102 and provides webpage content 120 to predictive model 175. Segmentation application 104 answers the query 102 based on a result obtained from the predictive model 175. Segmentation application 104 trains predictive model 175 with training data 140. Training data 140 includes training label 142 that identifies steps within a step of the tutorial content. For example, training label 142 can identify whether a particular sub-step is a start of a step, an end of a step, or another portion of a step, thereby delineating a step.

User device 110 provides query 102 to computing system 101 as input and receives query result 105 as output from computing system 101. Query 102 can be in natural language form. For example, query 102 could be a broad question such as "how do I paint a wall," which results in a result including multiple steps of a tutorial. The query 102 could also be a narrower question "how do I open the can of paint?" The answer to this question might be part of a step of a tutorial. Similarly, user operating user device 110 can submit a new query such as "Okay, what next?" In response, user device 110 requests the next step in the tutorial from computing system 101 and provides the next step to the user.

User device 110 can include an output device such as a display, touch screen, or speaker. For example, an output device can speak query result 105, specifically the steps of the tutorial obtained from webpage content 120. In other embodiments, an output device can display the query result 105 on a display. Alternatively, query result 105 may be provided to another application.

In an example, segmentation application 104 searches for webpage content 120. The segmentation application 104 may connect to the Internet and search for webpage content 120. In other embodiments, the webpage content 120 may already be downloaded, processed, and stored locally, for example, in local storage, or stored on a remote system.

The segmentation application 104 receives the webpage content 120 and provides the webpage content 120 to the predictive model 175. Based on the training, predictive model 175 segments the steps as appropriate. More specifically, the predictive model 175 predicts the location of the answer to the query 102, specifically "how do I open a can of paint?" The segmentation application 104 may index the resulting steps for later retrieval based on a query.

Segmentation application 104 receives a query 102 from user device 110. For example, segmentation application 104 receives query 102, "how do I open a can of paint?" from user device 110. Based on the query, segmentation application 104 determines the answer to the query from the retrieved and segmented content. The segmentation application 104 makes a determination about which content to use based on the query 102.

The segmentation application 104 provides the query result 105 of query 102 to the user device 110. As depicted in FIG. 1, a speaker operating with text-to-speech or artificial intelligence capability can provide the query result 105. An output device can speak the query result of the query 102, for example, one step at a time.

Segmentation application 104 can search for specific information or operate based on stored-information. For example, the segmentation application 104 can search for webpage content 120 before or after receiving query 102.

Figure 2:
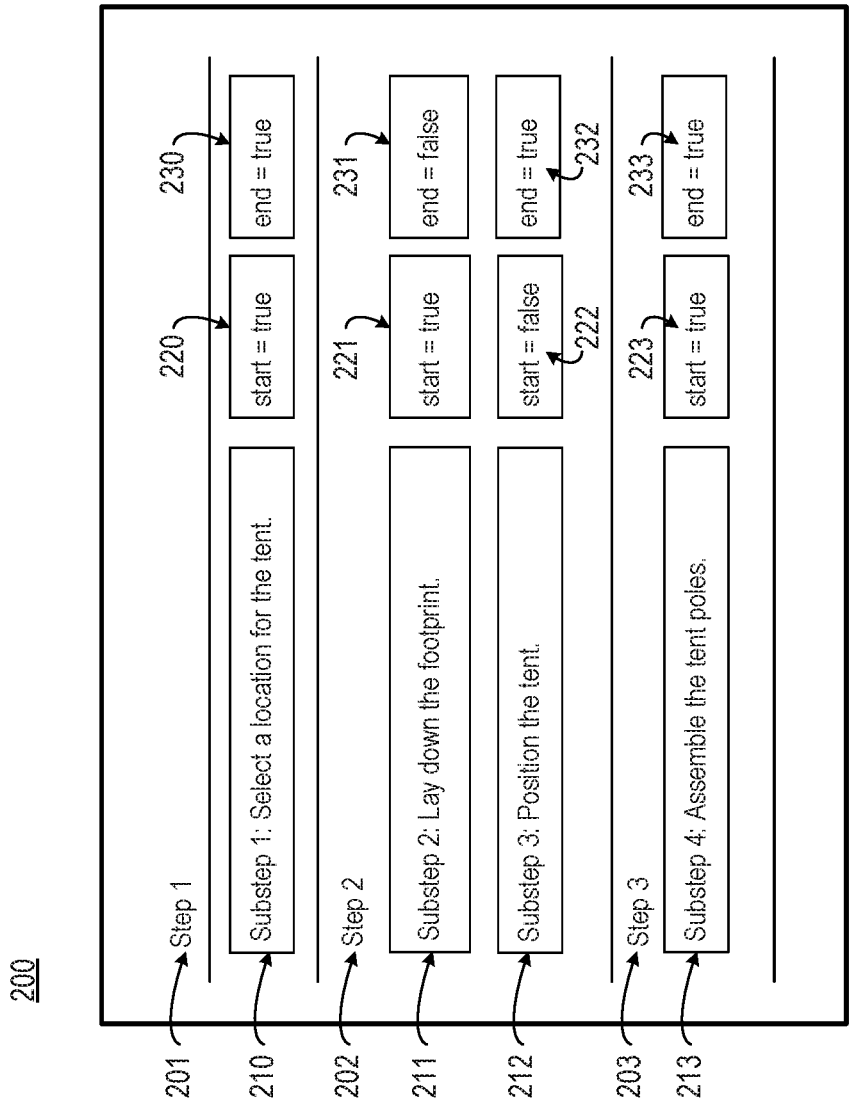
FIG. 2 depicts an instance of training data for a text segmentation system, according to certain embodiments of the present disclosure.

As discussed with respect to FIG. 1, predictive model 175 is trained with training data 140. FIG. 2 depicts an instance of training data for a text segmentation system, according to certain embodiments of the present disclosure. FIG. 2 shows training data 200 derived from an online instruction manual concerning how to pitch a tent. As shown in FIG. 2, training data 200 includes three steps: step 201, step 202, and step 203. Steps 201-203 correspond to steps in the online instruction manual. Step 201 ("step 1") recites "select a location for the tent." Step 202 ("step 2") recites "Lay down the footprint, position the tent." Step 203 ("step 3") is "assemble the tent poles."

Because each step of an instruction manual can have one or more sub-steps, each step of training data 200 can have multiple sub-steps. As can be seen in FIG. 2, step 201 includes one sub-step 210, step 202 includes two sub-steps 211 and 212, and step 203 includes one sub-step 213. Each sub-step 210-212 includes training labels such as a start label. Start labels are used by the predictive model 175 to learn how to segment content.

Start labels 220, 221, 222, and 223 correspond to sub-steps 210, 211, 212, and 213 respectively. Start labels 220-223 indicate whether the corresponding sub-step is the first sub-step in the step. For example, sub-step 210 is the first sub-step in step 210, therefore start labels 220 is set to "true." Similarly, sub-step 211 is the first sub-step in step 201, therefore the start labels 221 is set to "true," and sub-step 213 is the first sub-step in step 203, therefore start labels 223 is set to true. By knowing start label 220 and start label 221, predictive model knows that step 210 only includes one sub-step. The use of training data as illustrated in FIG. 2 is further described with respect to FIG. 3.

Search environment 100 can accommodate queries 102 that are different granularity levels. For example, in response to the query "how do I paint a wall?" search environment 100 responds with a tutorial describing how to do so. A query 102 could also map to a step of a tutorial. For example, in response to the query, "how do I open a can of paint?" the search environment responds with "break the seal and use the screwdriver to pry open the lid," e.g., via a voice assistant.

Search environment 100 can determine the relevant trained predictive models to use based on query 102. In order to predict finer-granularity parts of tutorial content that are smaller than a step, e.g., a sub-step, search environment 100 can use a second predictive model. Segmentation application 104 trains the second predictive model with training data that includes end labels representing the end of steps. In conjunction with each other, the two predictive models enable the prediction of sub-steps within steps.

Training data 140 is annotated with end labels 230, 231, 232, and 233 that correspond to sub-steps 210, 211, 212 and 213 respectively. End labels 230-233 indicate whether the corresponding sub-step is the last sub-step in the step. For example, sub-step 210 is the last (and only) sub-step in step 201, therefore end label 230 is set to "true." Similarly, sub-step 212 is the last sub-step in step 202, therefore the end label 232 is set to "true," and sub-step 213 is the last (and only) sub-step in step 203, therefore end label 233 is set to true. The use of an additional predictive model is discussed with respect to FIG. 4.

Embodiments disclosed herein receive queries from users and respond with query results that answer the query. The granularity of the user query versus the webpage content 120 can vary. For example, a user query can be answered by one step from an instruction manual. In other cases, a user query is answered by a sub-step from an instruction manual.

Search environment 100 can handle either case. For fixed-granularity queries such as steps, segmentation application 104 can use the method described in FIG. 3. By training with the start of each sub-step, predictive model 175 can predict the start of each step in a tutorial. The end of each step is implicit and is not predicted. In the case that the query 102 is a finer-granularity query, e.g., one that is represented by a sub-step, segmentation application 104 can use the method described in FIG. 4.

Figure 3:
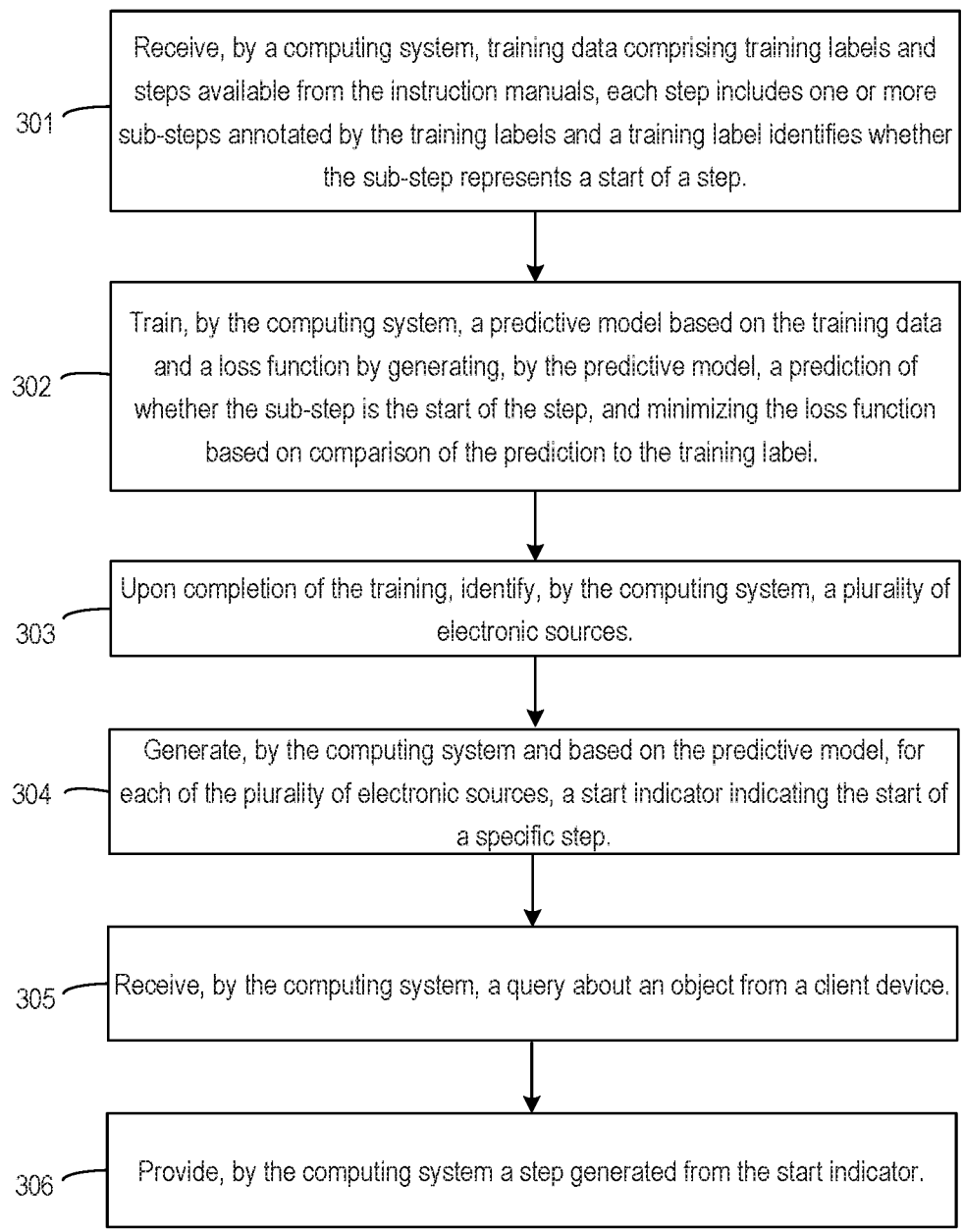
FIG. 3 depicts a method of training for a text segmentation system, according to certain embodiments of the present disclosure.

FIG. 3 depicts a method of training for a text segmentation system, according to certain embodiments of the present disclosure. As discussed, predictive model 175 is trained using training data 140 in order to be able to predict steps from an online instruction manual. At block 301, method 300 involves receiving, by a computing system, training data comprising training labels and steps available from the instruction manuals. In an example, a segmentation application (e.g., segmentation application 104 of FIG. 1) receives the training data (e.g., training data 140 of FIG. 1). Each step includes one or more sub-steps annotated by the training labels. Each training label for a sub-step identifies whether the sub-step represents a start of a step. Training data 140 can be gathered from various sources, including existing online instruction manual content, websites, and the like.

At block 302, method 300 involves training, by the computing system, a predictive model based on the training data and a loss function by generating, by the predictive model, a prediction of whether the sub-step is the start of the step, and minimizing the loss function based on comparison of the prediction to the training label. Computing system 101 provides the training data 140, which can include entries similar to training data 200, to the predictive model 175.

Predictive model 175 learns to predict instruction manual content based on the training data 140. Using an iterative process, predictive model 175 processes an element of training data 140, makes a prediction about the start of a step. The predictive model 175 calculates a loss function and then seeks to minimize the loss function. For example, because training data 140 includes the correct, annotated start labels such as labels 220-223, the predictive model 175 can determine whether its prediction is correct or incorrect. By iterating over different training data, predictive model 175 learns to accurately predict the start of steps.

Returning to FIG. 3, at block 303, method 300 involves upon completion of the training, identifying, by the computing system, a plurality of electronic sources. Segmentation application 104 identifies multiple sources such as webpage content 120, downloads the sources and stores the sources and indexes the sources if appropriate.

At block 304, method 300 involves generating, by the computing system based on the predictive model, for each of the plurality of electronic sources, a start indicator indicating a start of a specific step. Segmentation application 104 provides webpage content 120 to predictive model 175. Predictive model 175 determines, for each source, a start indicator indicating the start of a specific step. For example, a specific step within an electronic source directed to tents could be "determine a safe and dry location for the tent."

At block 305, method 300 involves receiving, by the computing system, a query about an object from a client device. More specifically, segmentation application 104 receives a query 102 from user device 110. For example, segmentation application 104 receives query 102, "how do I open a can of paint?" from user device 110.

At block 306, method 300 involves providing, by the computing system a step generated from the start indicator. Segmentation application 104 accesses previously obtained electronic sources such as webpage content 120. From webpage content 120, segmentation application 104 determines the appropriate identified step, i.e., a step identified at block 304, and provides the step to the client device. In an embodiment, the client device provides the step to a voice assistant.

Segmentation application 104 provides the prediction obtained from the predictive model 175 to the user device 110. The user device 110 includes query result 105. An output device, such as a display, touch screen, or speaker, can provide the prediction to the user in an appropriate fashion.

As discussed, search environment 100 can be trained to answer queries that vary in granularity. Based on the query, segmentation application 104 selects the appropriate methods and predictive models. In the case of a query 102 that corresponds to an entire tutorial or a step within the website content, segmentation application 104 can use the method described in FIG. 3. Segmentation application 104 can also train predictive model 175 to predict smaller steps such as sub-sub-steps or sub-sub-sub-steps, etc.

If the query 102 is smaller than a step of a tutorial, then segmentation application 104 uses the method described in FIG. 4. FIG. 4 describes an embodiment in which computing system 101 may use more than one predictive model, each model trained to make different predictions. In this case, because the granularity can include sub-steps of a step, the segmentation application 104 uses two predictive models in order to predict not just whether the step that is the start of a step, but also whether the sub-step that is the end of a step. A first predictive model is trained to predict the sub-step that indicates the start of a step, and a second predictive model trained to predict the sub-step that indicates the end of a step.

At block 401, method 400 involves receiving, by a computing system, training data including training labels and steps available from the instruction manuals, each step includes one or more sub-steps annotated by the training labels and a training label identifies whether the sub-step represents a start of a step and whether a sub-step represents an end of the step, where the query is a request for a specific sub-step. For example, as discussed with respect to FIG. 2, training data 200 includes start labels 220, 221, 222, and 223 and end labels 230, 231, 232, and 233.

At block 402, method 400 involves training, by the computing system, a predictive model based on the training data and a loss function by generating, by the predictive model, a prediction of whether the sub-step is the start of the step, and minimizing the loss function based on comparison of the prediction to the training label. Computing system 101 provides training data 140 to predictive model 175. Block 402 functions similarly to and can correspond to block 302 in method 300.

At block 403, method 400 involves training, by the computing system, an additional predictive model based on the training data and an additional loss function by at least generating, by the additional predictive model, an additional prediction of whether the sub-step is the end of the step, and minimizing the additional loss function based on a comparison of the additional prediction to the training label. Compared to the training at block 303 and 403, which are trained to predict the start of a step, block 403 involves training a second predictive model to predict the end of a step.

More specifically, predictive model 175 learns to predict the sub-steps that are the start and end of steps within instruction manual content based on the training data 140. Using an iterative process, the second predictive model processes an element of training data 140, makes a prediction about the end of a step. The second predictive model calculates a loss function and then seeks to minimize the loss function. For example, because training data 140 includes the correct, annotated end labels such as end labels 230-233, the second predictive model knows whether its prediction is correct or incorrect. By iterating over different training data, the second predictive model learns to accurately predict the sub steps that are the end of the steps.

At block 404, method 400 involves receiving, by the computing system, a query about an object from a client device. Segmentation application 104 receives a query 102 from user device 110.

At block 405, method 400 involves identifying, by the computing system and based on the query, a plurality of electronic sources. In contrast to method 300, in method 400, segmentation application 104 requests and receives webpage content 120 based on query 102 and provides webpage content 120 to the predictive models.

At block 406, method 400 involves generating, by the computing system a specific step of a tutorial based on the predictive model and the additional predictive model. The predictive models analyze the webpage content 120 and determine the specific step of the tutorial relevant to the query 102. For example, the predictive models may determine that a response to the question "how do I open a can of paint?" is "use screwdriver to break open lid."

Figure 5:
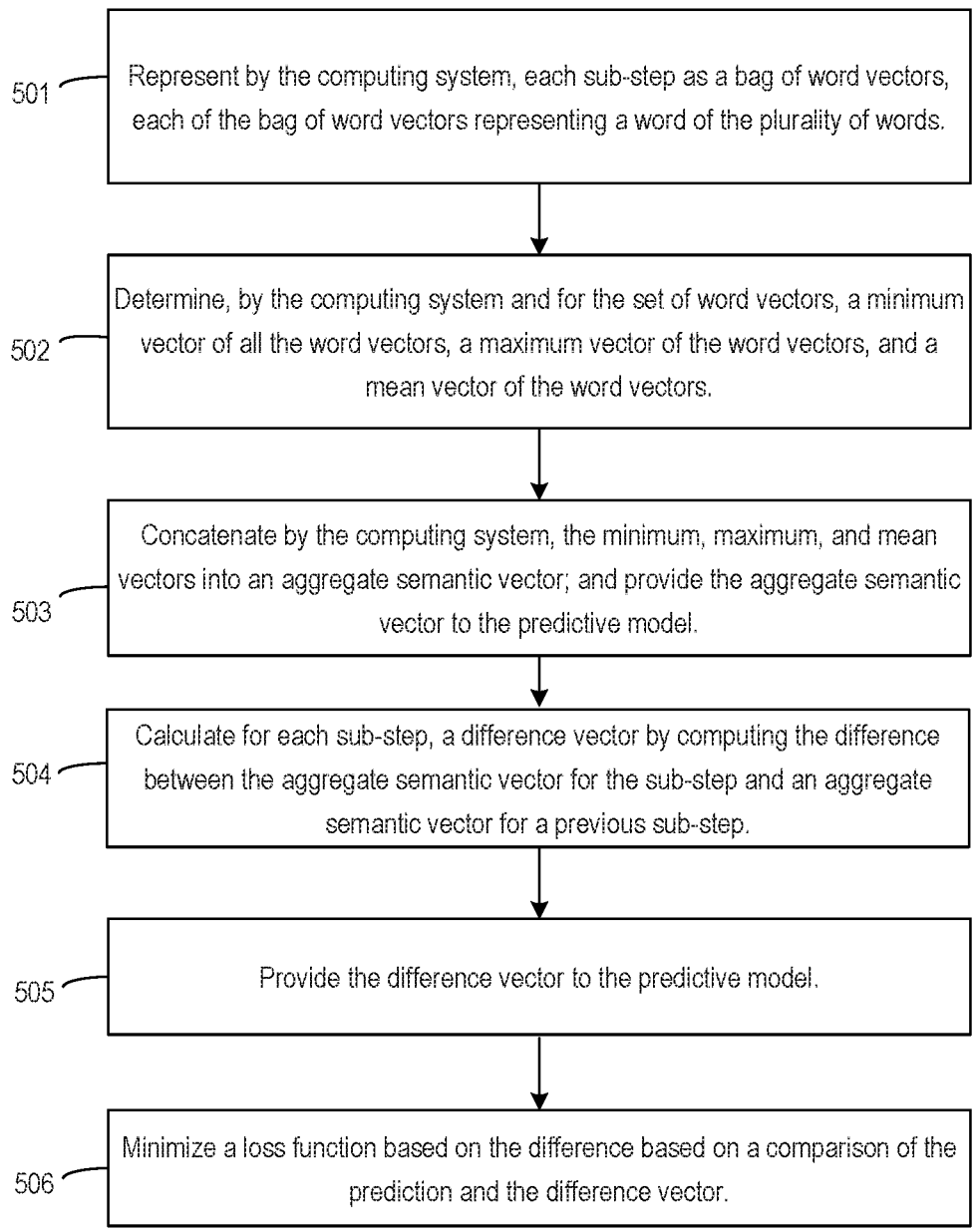
FIG. 5 depicts a method of training for a text segmentation system using word embedding, according to certain embodiments of the present disclosure.

In some embodiments, additional data that is derived from the sub-steps in the training data may be provided as input to the predictive model 175 for training purposes or at run-time, e.g., when using the segmentation application 104. Such training includes extracting word vectors from the text representing the sub-steps. FIG. 5 depicts a method of training for a text segmentation system using word embedding, according to certain embodiments of the present disclosure. Method 500 can be a more specific implementation of method 300.

At block 501, method 500 involves representing, by the computing system, each sub-step as a bag of word vectors, each of the bag of word vectors representing a word of the plurality of words. For example, each sub-step can be represented by a bag of vectors, where each vector represents a word within the sub-step. Using sub-step 210 as an example, sub-step 210 recites "select a location for the tent," and includes words "select," "a," "location," and so on. Words "select," "a," and "location," are represented by vectors $w_1$, $w_2$, $w_3$, where: $w_1=(x_{1,1}, \ldots, x_{1,d})$, $w_2=(x_{2,1}, \ldots, x_{2,d})$, and $w_3=(x_{3,1}, \ldots, x_{3,d})$, up to $w_n=(x_{n,1}, \ldots, x_{n,d})$ for n words, where d is the dimension of each word embedding.

At block 502, method 500 involves determining, by the computing system and for the set of word vectors, a minimum vector of all the word vectors, a maximum vector of the word vectors, and a mean vector of all of the word vectors for a sub-step. Because sub-steps can have different numbers of words, determining minimum, maximum, and mean vectors normalizes vector size between sub-steps. For example, mean $a=(a_1, \ldots, a_d)=\text{mean}(w_1, \ldots, w_n)$, minimum $b=(b_1, \ldots, b_d)=\min(w_1, \ldots, w_n)$, and maximum $c=(c_1, \ldots, c_d)=\max(w_1, \ldots, w_n)$ are generated for the set of word vectors that represent the words in a sub-step.

At block 503, method 500 involves concatenating, by the computing system, the minimum, maximum, and mean vectors into an aggregate semantic vector; and providing, the aggregate semantic vector to the predictive model. For example, from the mean, minimum, and maximum vectors, a concatenated vector is generated by concatenating vector a, followed by vector b, then vector c, e.g., $v=(a_1, \ldots, a_d, b_1, \ldots, b_d, c_1, \ldots, c_d)$.

At block 504, method 500 involves calculating, for each sub-step, a difference vector by computing the difference between the aggregate semantic vector for the sub-step and an aggregate semantic vector for a previous sub-step. Because the differences between semantics are often more important to predictive models than the semantics themselves, in some embodiments, the computing system 101 will generate difference vectors. For example, a first difference vector is set to zero: $v_{diff,1}=0$. A second difference vector is determined by the difference between a concatenated vector generated at block 503 for the second sub-step, and a concatenated vector generated at block 503 for the first word in a sub-step, e.g., $v_{diff,2}=v_2-v_1$. The process continues through all of the sub-steps, e.g., up to $v_{diff,k}=v_k-v_{k-1}$, where k denotes the number of sub-steps.

At block 505, method 500 involves providing the difference vector to the predictive model. Computing system 101 provides the semantic difference vectors $v_{diff,1} \ldots v_{diff,k}$ to the predictive model along with the corresponding labels $y_1 \ldots y_k$ that indicate whether a corresponding sub-step is the start of a step. At block 506, method 500 involves minimizing a loss function based on the difference based on a comparison of the prediction and the difference vector. More specifically, the predictive model is trained based on the vectors and the corresponding labels, the predictive model. Similar to the training described with respect to FIGS. 3 and 4, the predictive model will compare the predictions to received difference vectors, and create a loss function. The predictive model will attempt to minimize the loss function, i.e., the difference between the received vectors and its created vectors.

Similarly, the segmentation application 104 can use this process at run-time. More specifically, the segmentation application 104 represents each sub-step as a bag, or set, of word vectors. The segmentation application 104 concatenates the minimum, maximum, and mean vectors into an aggregate semantic vector, and creates a difference vector. The segmentation application 104 provides the difference vector to the predictive model.

Figure 6:
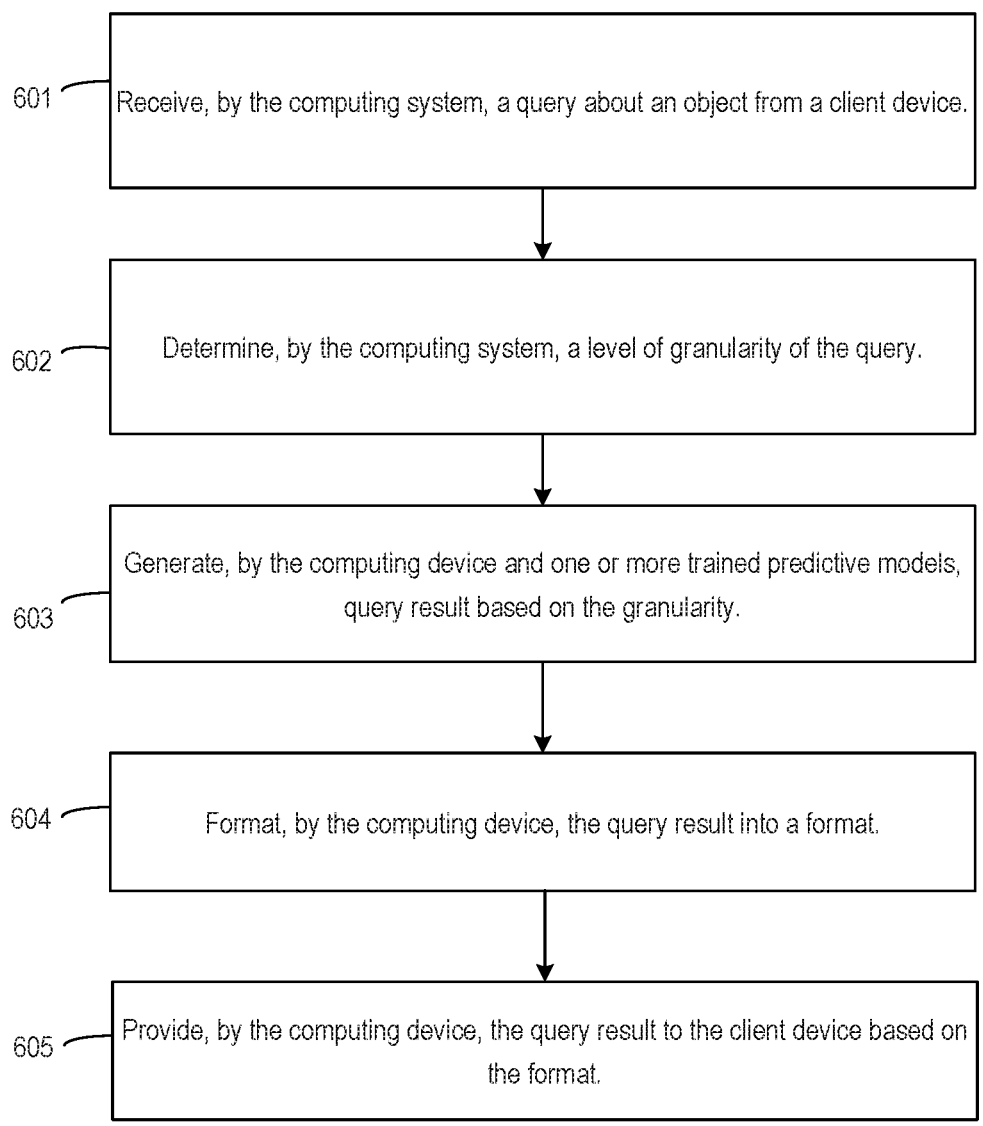
FIG. 6 depicts a method of using a segmentation system, according to certain embodiments of the present disclosure.

In further embodiments, search environment 100 can receive the segmented content, i.e., the steps or sub-steps, to users in different manners such as text or video. FIG. 6 depicts a method of using a segmentation system, according to certain embodiments of the present disclosure. Search environment 100 can accommodate queries 102 that are different granularity levels.

At block 601, method 600 involves receiving, by the computing system, a query about an object from a client device. More specifically, segmentation application 104 receives a query 102 from user device 110.

At block 602, method 600 involves determining, by the computing system, a level of granularity of the query. For example, segmentation application 104 can apply content segmented using method 300 to determine whether a step of an instruction manual already segmented matches the query. If not, then segmentation application 104 can provide the query to method 400 in order to determine a sub-step from an instruction manual that can answer the query. In embodiments, the segmentation application 104 can use scores that represent a probability that a particular configuration can return an answer to the query.

Based on the scores, the segmentation application 104 can chose whether to use method 300 or method 400.

By using method 600, segmentation application can determine the relevant trained predictive models to use. Segmentation application 104 compares the query to the electronic sources in order to determine the granularity of the query 102.

At block 603, method 600 involves generating, by the computing device and one or more trained predictive models, query result based on the granularity. For example, if the query 102 matches to a step of a tutorial, then segmentation application 104 can use method 300 which involves predictive model 175. In order to predict finer-granularity parts of tutorial content that are smaller than a step, e.g., a sub-step, search environment 100 can use a second predictive model, as illustrated by method 400.

At block 604, method 600 involves formatting, by the computing device, the query result into a format. Segmentation application 104 can prepare the query result 105 for different formats such as text, video, voice, etc. Segmentation application 104 can present the query result 106 a word at a time, sub-step at a time, step at a time, or whole tutorial at a time.

Segmentation application 104 can perform different actions based on the source of the original electronic content. For example, if the electronic source is text, then segmentation application 104 can summarize the segmented text for a user. For example, if query 102 returns an entire tutorial, then segmentation application 104 can present the entire tutorial to a user. But presenting an entire tutorial at a time may result in too much information being displayed on a mobile display or too much speech being generated by a voice assistant. Segmentation application 104 can cause an output device to pause when outputting the resulting tutorial output.

Segmentation application 104 can also provide summaries of the segmented content. The segmentation application 104 can also summarize a tutorial by using a summarization framework that is trained with a data set such as "TL;DR" dataset (M Völske, M Potthast, S Syed, B Stein "TL; DR: Mining Reddit to Learn Automatic Summarization"). The "TL;DR" dataset provides high quality abstract summaries of electronic content, such as a coherent shorter version of content. Such a shortened version of content can be appropriate for some instructional manual content when low-level details are not needed.

Segmentation application 104 can also use a predictive model to create a summary of the steps. In this case, predictive model 175 may be trained to create summaries by using training labels. By learning to predict high-level steps or points by training with data annotated by labels indicating the important points in an electronic source, the predictive model can learn to predict key points for a summary.

Segmentation application 104 can perform different actions if the webpage content 120 is video. For example, if the webpage content is a tutorial video about how to assemble a piece of furniture, segmentation application 104 converts the video into unstructured text by using speech-to-text recognition.

Segmentation application 104 provides the unstructured text into the trained predictive model 175. Predictive model 175 identifies the steps in the as portions of text and provides them to the segmentation application 104. Segmentation application 104 remaps the portions of text back to the corresponding video segments. For example, a specific step is matched with the start and end time of a corresponding video segment. The segmentation application 104 can provide hyperlinks for each step to the relevant segment of the video and provide the hyperlinks to the user. This way, the user can see the text and video corresponding to each relevant step.

The electronic source can be images such as captured images or saved images with or without embedded text. For example, using a camera on user device 110 such as a smart phone, the segmentation application 104 can receive a photo of an instruction manual with pictures. Segmentation application 104 performs object recognition on the images. For example, some online tutorials about how to assemble furniture do not include words but instead rely on images. Segmentation application 104 identifies a hammer and a nail in webpage content about how to assemble furniture. The segmentation application 104 can also apply optical character recognition on any words in the image and provide the words to the predictive model.

At block 605, method 600 involves providing, by the computing device, the query result to the client device based on the format. As discussed with respect to FIG. 1, segmentation application 104 can cause an output device such as a voice assistant or text-to-speech system to speak the query result 105. Segmentation application 104 can also provide the query result 105 on a display such as a touch screen.

In other embodiments, a user may request the result be transmitted by a text-to-speech or artificial intelligence-based voice assistant system. Segmentation application 104 provides the query result 105 in a manner suitable for processing by such a system.

Figure 7:
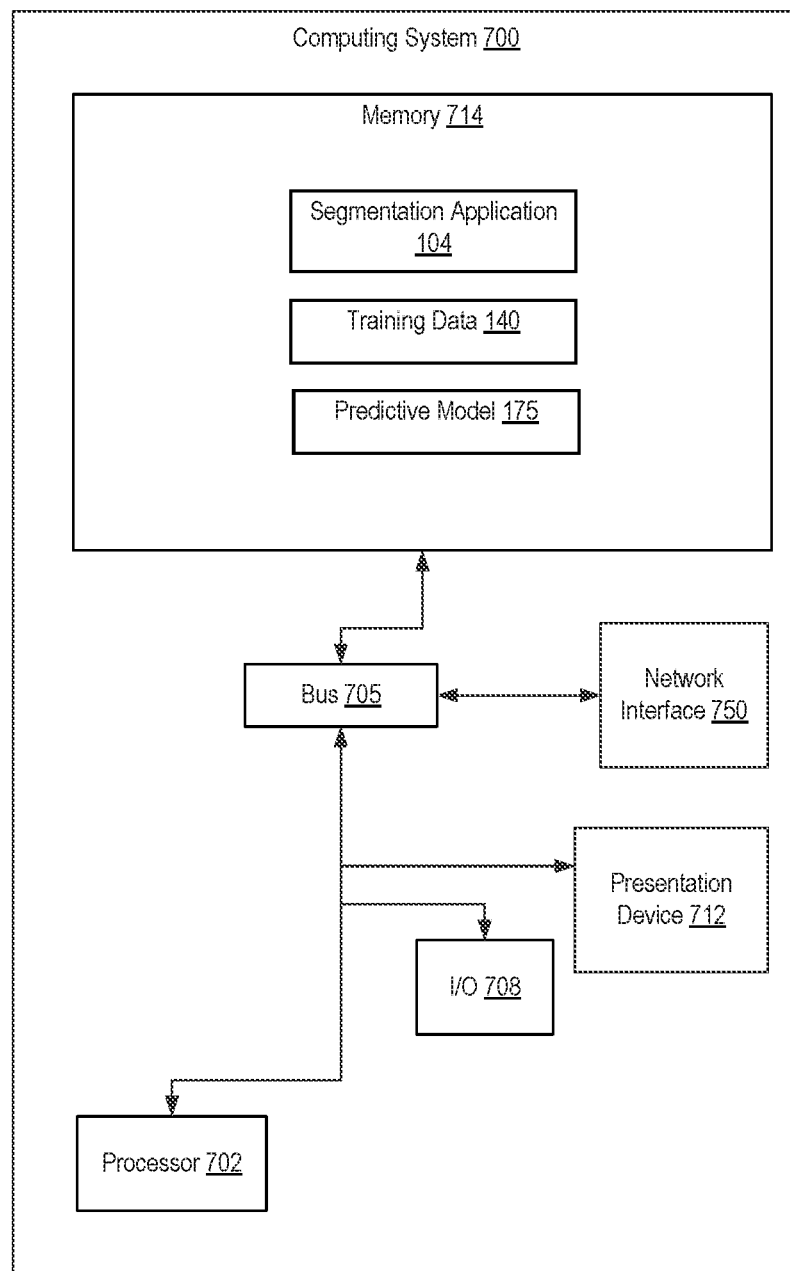
FIG. 7 depicts an example computing system for text segmentation, according to certain embodiments of the present disclosure.

FIG. 7 depicts an example computing system for determining insights from a predictive model, according to certain embodiments of the present disclosure. Some of the components of the computing system 700 can belong to the computing system 101 of FIG. 1. For example, the segmentation application 104 may operate on the computing system 700. The computing system 700 includes one or more processors 702 communicatively coupled to one or more memory devices 714. The processor 702 executes computer-executable program code, which can be in the form of non-transitory computer-executable instructions, stored in the memory device 714, accesses information stored in the memory device 714, or both. Examples of the processor 702 include a microprocessor, an application-specific integrated circuit ("ASIC"), a field-programmable gate array ("FPGA"), or any other suitable processing device. The processor 702 can include any number of processing devices, including one.

The memory device 714 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 700 may also include a number of external or internal devices such as input or output devices. For example, the computing system 700 is shown with an input/output ("I/O") interface 708 that can receive input from input devices or provide output to output devices. A bus 705 can also be included in the computing system 700. The bus 705 can communicatively couple one or more components of the computing system 700 and allow for communication between such components.

The computing system 700 executes program code that configures the processor 702 to perform one or more of the operations described above with respect to FIGS. 1-6. The program code of the segmentation application 104, which can be in the form of non-transitory computer-executable instructions, can be resident in the memory device 714 or any suitable computer-readable medium and can be executed by the processor 702 or any other one or more suitable processor. Execution of such program code configures or causes the processor(s) to perform the operations described herein with respect to the computing system 101. In additional or alternative embodiments, the program code described above can be stored in one or more memory devices accessible by the computing system 700 from a remote storage device via a data network. The computing system 101 and any processes can use the memory device 714. The memory device 714 can store, for example, additional programs, or data such as training data 140 used by the applications executing on the processor 702 such as the segmentation application 104.

The computing system 700 also includes at least one network interface 750. The network interface 750 includes any device or group of devices suitable for establishing a wired or wireless data connection to one or more data networks. Non-limiting examples of the network interface 750 include an Ethernet network adapter, a modem, and/or the like. The computing system 700 is able to communicate with one or more other computing devices or computer-readable data sources via a data network using the network interface 750.

The computing system 700 includes a presentation device 712. A presentation device 712 can include any device or group of devices suitable for providing visual, auditory, or other suitable sensory output. Non-limiting examples of the presentation device 712 include a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method for segmenting text content from instruction manuals available from electronic sources, wherein the method involves a computing system performing operations comprising:
   receiving training data comprising training labels and steps available from the instruction manuals, wherein each step comprises one or more sub-steps annotated by the training labels, wherein a training label identifies whether a sub-step represents a start of a step;
   training a predictive model to predict a start of each step described in each of the instruction manuals, wherein the training is based on the training data and a loss function, the training comprising:
      inputting the training data into the predictive model;
      for each of the steps described in each of the instruction manuals, receiving, from the predictive model, a prediction of whether each corresponding sub-step is the start of the respective step, and minimizing the loss function based on comparison of each prediction to the respective training label;

upon completion of the training, receiving a query about an object from a client device;

identifying text from a plurality of electronic sources, wherein the text corresponds to the object;

providing the text to the predictive model;

receiving, from the predictive model, a start indicator indicating a start of a specific step in the text, wherein the specific step provides instruction relating to the object; and providing, in response to the query, the specific step.

2. The method of claim 1, further comprising:

generating, by the computing system and from the plurality of electronic sources, an index comprising the start indicator;

matching, by the computing system and by the index, an additional query received from the client device to an electronic source of the plurality of electronic sources, the electronic source having additional instructions about an additional object;

retrieving, by the computing system and within the electronic source, an additional step corresponding to the additional query; and providing, by the computing system, the electronic source and the additional step to the client device.

3. The method of claim 1, wherein each sub-step comprises one or more sub-sub-steps annotated by the training labels and wherein each training label of the training labels further identifies whether a sub-sub-step is the start of a sub-step, the method further comprising:

training, by the computing system, a classification model to predict a granularity level for a query;

training, by the computing system, an additional predictive model based on the training data and an additional loss function by at least:

inputting the training data into the predictive model;

receiving, from the additional predictive model, an additional prediction of whether the sub-sub-step is the start of the sub-step; and minimizing the additional loss function based on a comparison of the additional prediction to the training label;

determining, using the classification model, a predicted granularity level; and responsive to determining whether the predicted granularity level corresponds to a sub-step or a sub-sub-step, generating a prediction with the predictive model or the additional predictive model.

4. The method of claim 1, wherein each training label of the training labels further identifies whether a sub-step represents an end of a respective step, wherein the query is a request for a specific sub-step, and wherein the plurality of electronic sources are identified based on the query, the method further comprising:

training, by the computing system, an additional predictive model based on the training data and an additional loss function by:

inputting the training data into the additional predictive model;

receiving, from the additional predictive model, an additional prediction of whether a sub-step identified by a training label is the end of a corresponding step; and minimizing the additional loss function based on a comparison of the additional prediction to the respective training label; and generating a specific step of one of the instruction manuals based on the predictive model and the additional predictive model.

5. The method of claim 4, further comprising:

detecting, based on the query, a granularity level identifying whether the query invokes a number of sub-steps; and responsive to determining that the granularity level indicates a step, using only the predictive model to generate the specific step.

6. The method of claim 1, wherein each sub-step comprises a plurality of words, wherein the training further comprises:

representing, by the computing system, each sub-step as a bag of word vectors, each of the bag of word vectors representing a word of the plurality of words;

determining, by the computing system and for the bag of word vectors, a minimum vector of the bag of word vectors, a maximum vector of the bag of word vectors, and a mean vector of the bag of word vectors;

concatenating, by the computing system, the minimum vector, the maximum vector, and the mean vector into an aggregate semantic vector; and providing, by the computing system, the aggregate semantic vector to the predictive model.

7. The method of claim 6, further comprising:

calculating, for each sub-step, a difference vector by computing a difference between the aggregate semantic vector for the sub-step and an aggregate semantic vector for a previous sub-step; and providing the difference vector to the predictive model.

8. The method of claim 1, wherein each of the plurality of electronic sources is one of (i) an unstructured document or (ii) a structured document that excludes labels indicating starts of steps.

9. The method of claim 1, further comprising:

generating, by the computing system and an additional predictive model, a summary of an electronic source of the plurality of electronic sources, wherein the electronic source includes additional instructions about the object; and providing, by the computing system to the client device, the summary.

10. The method of claim 1, further comprising:

delivering the specific step to one of (i) a voice-based virtual assistant operable to read the specific step aloud or (ii) a text-based virtual assistant.

11. The method of claim 1, further comprising:

retrieving, by the computing system and over a computer network, a video based on the query;

extracting, by the computing system and from the video, an electronic source of the plurality of electronic sources;

segmenting, by the computing system, the video according to the start of a specific step, a video segment corresponding to the specific step; and providing, by the computing system to the client device, a link to the video segment.

12. A system comprising a non-transitory computer-readable medium storing computer-executable instructions; and a processing device communicatively coupled to the non-transitory computer-readable medium for executing the computer-executable instructions, wherein executing the computer-executable instructions configures the system to perform operations comprising:
receiving, by a computing system, training data comprising training labels and steps available from instruction manuals, wherein each step comprises one or more sub-steps annotated by the training labels, wherein a training label identifies whether a sub-step represents a start of a step;
training, by the computing system, a predictive model to predict a start of each step described in each of the instruction manuals, wherein the training is based on the training data and a loss function, the training comprising:
inputting the training data into the predictive model;
for each of the steps described in each of the instruction manuals, receiving from the predictive model, a prediction of whether the sub-step is the start of the respective step, and
minimizing the loss function based on comparison of each prediction to the respective training label;
upon completion of the training, receiving, by the computing system from a client device, text from a query about an object;
identifying, by the computing system based on the text, an electronic source having instructions about the object;
providing, by the computing system, the text to the predictive model
receiving, from the predictive model, a start of a specific step descriptive of the instructions from the electronic source, wherein the specific step provides instruction relating to the object; and
providing, by the computing system to the client device, the start of the specific step.

13. The system of claim 12, wherein each training label of the training labels further identifies whether a sub-step represents an end of a respective step, wherein the query is a request for a specific sub-step, and wherein a plurality of electronic sources are identified based on the query, the operations further comprising:
training an additional predictive model based on the training data and an additional loss function by:
inputting the training data into the additional predictive model;
receiving generating, from the additional predictive model, an additional prediction of whether a sub-step identified by a training label is the end of a corresponding step, and
minimizing the additional loss function based on a comparison of the additional prediction to the respective training label; and
generating a specific step of a tutorial based on the predictive model and the additional predictive model.

14. The system of claim 12, the operations further comprising:
detecting, based on the query, a granularity level identifying whether the query invokes a number of sub-steps; and
responsive to determining that the granularity level indicates a step, using only the predictive model to generate the specific step.

15. A non-transitory computer-readable storage medium storing instructions, wherein the instructions, upon execution on a device, cause the device to perform operations comprising:
receiving, by the device, training data comprising training labels and steps available from instruction manuals, wherein each step comprises one or more sub-steps annotated by the training labels, wherein a training label identifies whether a sub-step represents a start of a step;
training, by the device, a predictive model to predict a start of each step described in each of the instruction manuals, wherein the training is based on the training data and a loss function, the training comprising:
inputting the training data into the predictive model;
for each of the steps described in each of the instruction manuals, receiving, from the predictive model, a prediction of whether the sub-step is the start of the respective step, and
minimizing the loss function based on comparison of the prediction to the training label;
upon completion of the training, identifying, by the device, a plurality of electronic sources;
providing, by the device to the predictive model, for each of the plurality of electronic sources, a start indicator indicating a start of a specific step;
receiving, from the predictive model, a start indicator indicating a start of a specific step in one of the plurality of electronic sources, wherein the specific step provides instruction relating to an object; and
providing, by the device and in response to a query about the object from a client device, a step generated from the start indicator.

16. The non-transitory computer-readable storage medium of claim 15, wherein the operations further comprise:
generating, by the device and from the plurality of electronic sources, an index comprising start indicators;
matching, by the device and by the index, an additional query received from the client device to one of the plurality of electronic sources having additional instructions about an additional object;
retrieving, by the device and within an electronic source of the electronic sources, an additional step corresponding to the additional query; and
providing, by the device, the electronic source and the additional step to the client device.

17. The non-transitory computer-readable storage medium of claim 15, wherein each sub-step comprises one or more sub-sub-steps annotated by the training labels and wherein each training label further identifies whether a sub-sub-step is the start of a sub-step and wherein the operations further comprise:
training, by the device, an additional predictive model based on the training data and an additional loss function by:
inputting the training data into the additional predictive model;
receiving, from the additional predictive model, an additional prediction of whether sub-sub-step identified by a training label is the start of a corresponding sub-step, and
minimizing the additional loss function based on a comparison of the additional prediction to the respective training label;
training, by the device, a classification model to predict a granularity level for a query;
determining, using the classification model, a predicted granularity level; and
responsive to determining, whether the granularity level corresponds to a step or a sub-step, generating a prediction with the predictive model or the additional predictive model.

18. The non-transitory computer-readable storage medium of claim 15, wherein each training label further identifies whether a sub-step represents an end of the respective step and the query is a request for a specific sub-step, wherein the plurality of electronic sources are identified based on the query, and wherein the operations further comprise:
   training, by the device, an additional predictive model based on the training data and an additional loss function by:
      generating, by the additional predictive model, an additional prediction of whether the sub-step identified by a training label in the training data is the end of a step, and
      minimizing the additional loss function based on a comparison of the additional prediction to the respective training label; and
   generating a specific step of a tutorial based on the predictive model and the additional predictive model.

19. The non-transitory computer-readable storage medium of claim 18, wherein the operations further comprise:
   detecting, based on the query, a granularity level identifying whether the query invokes a number of sub-steps; and
   responsive to determining that the granularity level is a first level, using only the predictive model to generate the specific step.

20. The non-transitory computer-readable storage medium of claim 15, wherein the operations further comprise:
   generating, by the device and an additional predictive model, a summary of the one of the electronic sources having instructions about the object; and
   providing, to the device, the summary.

* * * * *